(12) United States Patent
Lee et al.

(10) Patent No.: US 8,854,588 B2
(45) Date of Patent: *Oct. 7, 2014

(54) LIQUID CRYSTAL DISPLAY

(71) Applicant: Samsung Display Co., Ltd., Yongin (KR)

(72) Inventors: Mi-Sun Lee, Goyang-si (KR); Dong Woo Kim, Asan-si (KR); Young Woon Kho, Cheonan-si (KR); Jin Suk Cho, Cheonan-si (KR)

(73) Assignee: Samsung Display Co., Ltd., Yongin (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/058,614

(22) Filed: Oct. 21, 2013

(65) Prior Publication Data

US 2014/0043575 A1 Feb. 13, 2014

Related U.S. Application Data

(63) Continuation of application No. 13/352,049, filed on Jan. 17, 2012, now Pat. No. 8,593,605.

(30) Foreign Application Priority Data

Feb. 24, 2011 (KR) .................. 10-2011-0016691

(51) Int. Cl.
*G02F 1/1343* (2006.01)
*G02F 1/1362* (2006.01)

(52) U.S. Cl.
CPC .... *G02F 1/134309* (2013.01); *G02F 1/134363* (2013.01); *G02F 1/136209* (2013.01); *G02F 2201/40* (2013.01)
USPC ....................................... 349/141

(58) Field of Classification Search
CPC ............... G02F 1/134363; G02F 2001/134372
USPC ................................................ 349/141
See application file for complete search history.

(56) References Cited

U.S. PATENT DOCUMENTS

| 7,345,728 B2 | 3/2008 | Lee et al. |
| 8,189,158 B1 | 5/2012 | Kuo et al. |

(Continued)

FOREIGN PATENT DOCUMENTS

| JP | 2003-057673 | 2/2003 |
| JP | 2008-096839 | 4/2008 |

(Continued)

OTHER PUBLICATIONS

Non-Final Office Action issued on Mar. 29, 2013 in U.S. Appl. No. 13/352,049.

(Continued)

*Primary Examiner* — Thanh-Nhan P Nguyen
(74) *Attorney, Agent, or Firm* — H.C. Park & Associates, PLC

(57) ABSTRACT

The present invention relates to a liquid crystal display including: a first substrate and an opposing second substrate; a liquid crystal layer interposed between the first substrate and the second substrate; a light blocking member disposed on the first substrate or the second substrate; a first field generating electrode disposed on the first substrate; a second field generating electrode disposed on the first substrate and including branch electrodes overlapping the first field generating electrode; and a gate line disposed on the first substrate and extending in a first direction. A branch electrode of the branch electrodes includes a central portion and a first edge portion disposed at one end of the central portion. A first angle formed between the first edge portion and a second direction is greater than a second angle formed between the second direction and the central portion, the second direction being perpendicular to the first direction.

11 Claims, 12 Drawing Sheets

(56) References Cited

U.S. PATENT DOCUMENTS

| | | |
|---|---|---|
| 2006/0290869 A1 | 12/2006 | Suzuki |
| 2008/0074602 A1 | 3/2008 | Arai et al. |
| 2009/0244468 A1* | 10/2009 | Taniguchi et al. ............ 349/141 |
| 2010/0141885 A1 | 6/2010 | Han et al. |

FOREIGN PATENT DOCUMENTS

| | | |
|---|---|---|
| JP | 2009-109616 | 5/2009 |
| JP | 2010-009004 | 1/2010 |
| JP | 2010-072613 | 4/2010 |
| JP | 2010-145871 | 7/2010 |
| KR | 10-0336900 | 5/2002 |
| KR | 10-2009-0126466 | 12/2009 |
| KR | 10-0939159 | 1/2010 |
| KR | 10-2010-0046826 | 5/2010 |
| KR | 10-2010-0068636 | 6/2010 |

OTHER PUBLICATIONS

Final Office Action issued on Jun. 18, 2013 in U.S. Appl. No. 13/352,049.

Notice of Allowance issued on Aug. 7, 2013 in U.S. Appl. No. 13/352,049.

* cited by examiner

LIQUID CRYSTAL DISPLAY

CROSS-REFERENCE TO RELATED APPLICATION

This application is a continuation of U.S. patent application Ser. No. 13/352,049, filed on Jan. 17, 2012, and claims priority from and the benefit of Korean Patent Application No. 10-2011-0016691, filed on Feb. 24, 2011, which is hereby incorporated by reference for all purposes as if fully set forth herein.

BACKGROUND OF THE INVENTION

1. Field of the Invention

Exemplary embodiments of the present invention relate to a liquid crystal display.

2. Discussion of the Background

A liquid crystal display (LCD) is one of the most widely used type of flat panel displays (FPD). A liquid crystal display includes two display panels, on which field generating electrodes, such as a pixel electrode and a common electrode, are formed. A liquid crystal layer is interposed between the two display panels. A voltage is applied to the field generating electrodes to generate an electric field in the liquid crystal layer, and thereby control the orientation of liquid crystal molecules of the liquid crystal layer. The orientation of the liquid crystal molecules determines the polarization of incident light to display an image. The transmittance of the liquid crystal display may be increased by properly controlling the liquid crystal molecules.

Each pixel electrode of the liquid crystal display is connected to a switching element that is connected to signal lines, such as a gate line and a data line. The switching element may be a thin film transistor that transfers a data voltage to the pixel electrode through an output terminal thereof.

In the liquid crystal display, the pixel electrode and the common electrode may be provided on a display panel where the switching element is formed. One of the pixel electrode and the common electrode of the liquid crystal display may include a plurality of branch electrodes, and the other may be rectangular. When the inclinations of the liquid crystal molecules positioned at the edge of the branches are overlapped, textures may be generated. Also, if pressure is applied to the display pane, the liquid crystal molecules may not recover, such that display stains may be generated.

The above information disclosed in this Background section is only for enhancement of understanding of the background of the invention and therefore it may contain information that does not form the prior art that is already known in this country to a person of ordinary skill in the art.

SUMMARY OF THE INVENTION

Exemplary embodiments of the present invention reduce display deterioration, such as texture and stains, and simultaneously increase the transmittance and aperture ratio of a liquid crystal display.

Additional features of the invention will be set forth in the description which follows, and in part will be apparent from the description, or may be learned by practice of the invention.

Exemplary embodiments of the present invention provide a liquid crystal display including two field generating electrodes, a pixel electrode and a common electrode, formed on a display panel. One of the field generating electrodes is rectangular, and the other includes a plurality of branches overlapping the planar electrode.

A liquid crystal display according to an exemplary embodiment of the present invention includes: a first substrate and an opposing second substrate; a liquid crystal layer interposed between the first substrate and the second substrate; a light blocking member formed on the first substrate or the second substrate; a first field generating electrode formed on the first substrate; a second field generating electrode overlapping the first field generating electrode and including a plurality of branch electrodes; and a gate line formed on the first substrate and extending in a first direction. A branch electrode of the branch electrodes includes a central portion and a first edge portion disposed at one end of the central portion. The first edge portion extends lengthwise at a first angle with respect to a second direction that is perpendicular to the first direction. The central portion extends lengthwise at a second angle with respect to the second direction. The first angle is larger than the second angle. The first edge portion overlaps the light blocking member.

Exemplary embodiments of the present invention provide a liquid crystal display including: a first substrate and an opposing second substrate; a liquid crystal layer interposed between the first substrate and the second substrate; a first field generating electrode disposed on the first substrate; a second field generating electrode overlapping the first field generating electrode and including branch electrodes; and a gate line disposed on the first substrate and extending in a first direction. A slit between adjacent branch electrodes includes a first edge, an opposing second edge, and a third edge that extends between the first and second edges. The first and second edges are generally parallel, i.e., are equidistant from one another. An angle formed between the third edge and a second direction ranges from about 30 degrees to about 75 degrees, the second direction being perpendicular to the first direction.

According to an exemplary embodiment of the present invention, a field generation electrode of a liquid crystal display includes branch electrodes, different portions of which extending at different angles. A light blocking member is disposed over a curved end portion of the branch electrodes, such that a transmittance decrease in the vicinity of the edge of the branch electrodes may be minimized.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE EMBODIMENTS

Figure 1:
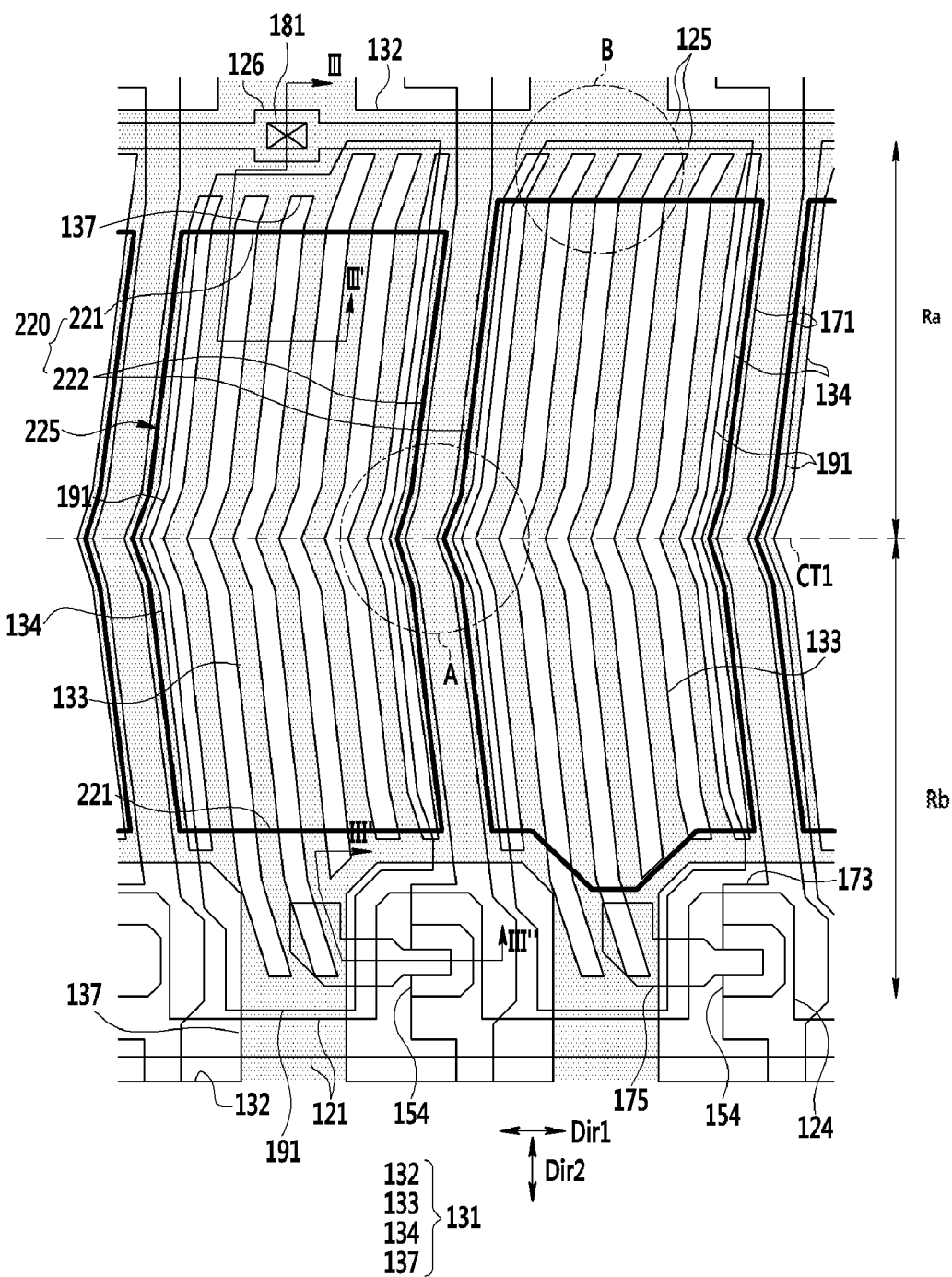
FIG. 1 is a schematic layout view of two pixels of a liquid crystal display, according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

Figure 2:
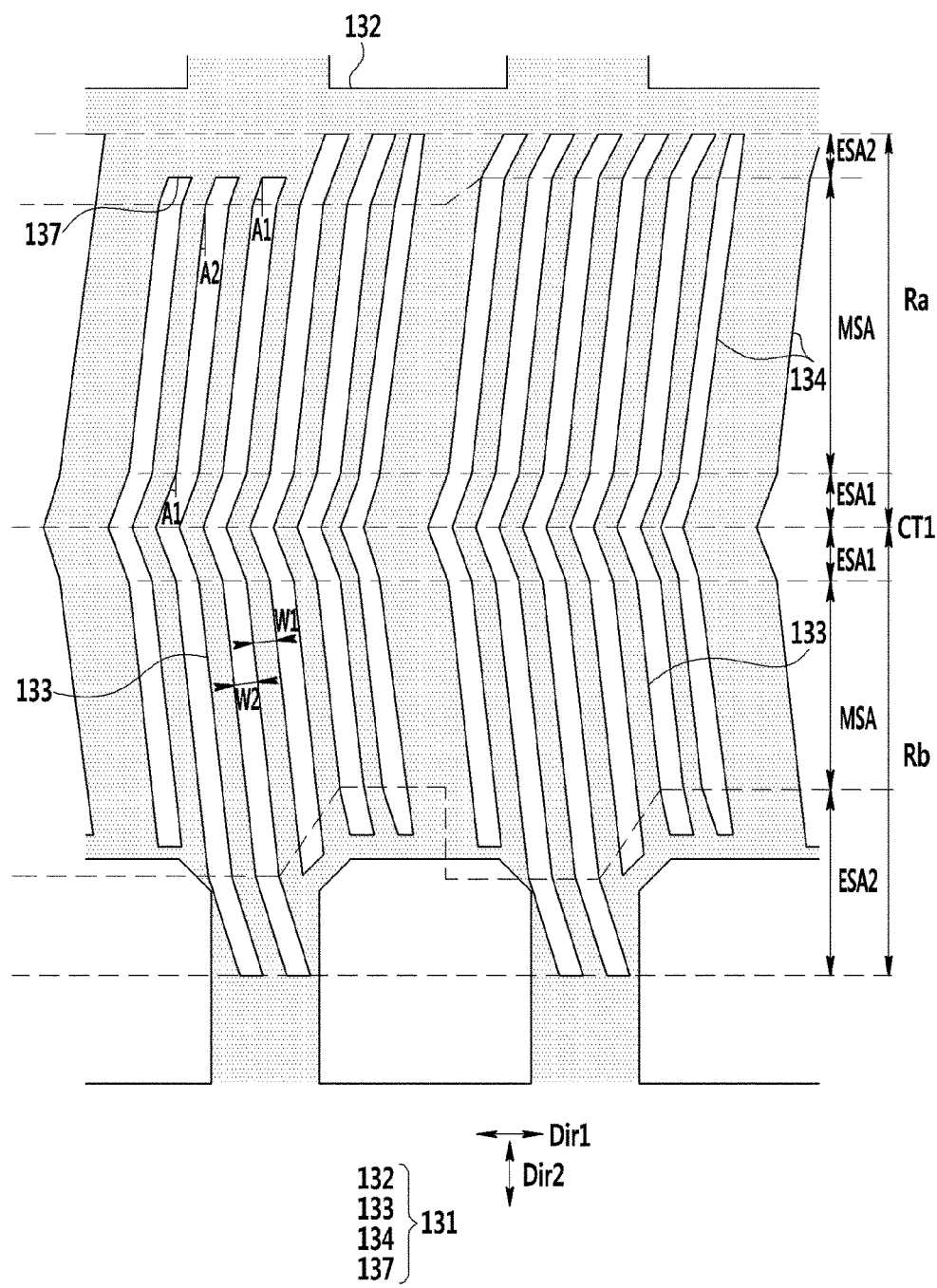
FIG. 2 is a top plan view of a field generating electrode of the liquid crystal display shown in FIG. 1.
Figure 3:
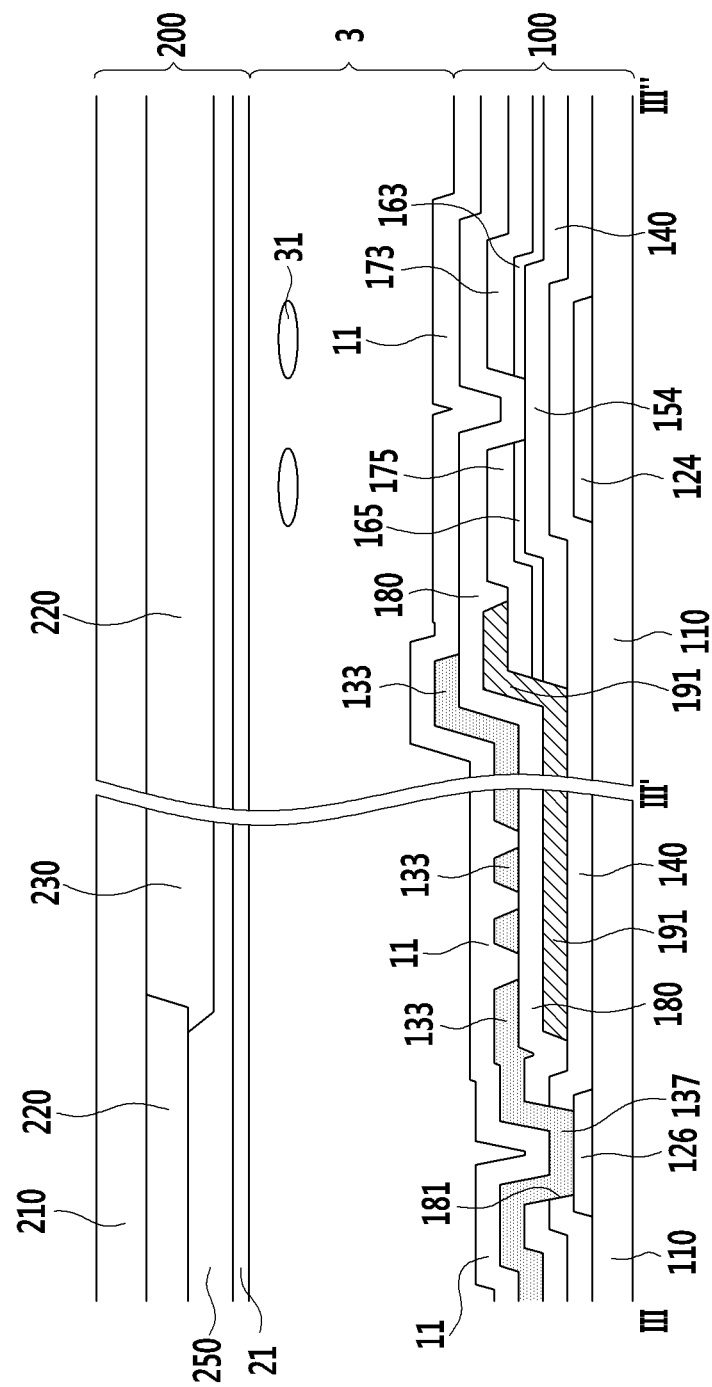
FIG. 3 is a cross-sectional view of the liquid crystal display shown in FIG. 1, taken along the line III-III'-III".
Figure 4:
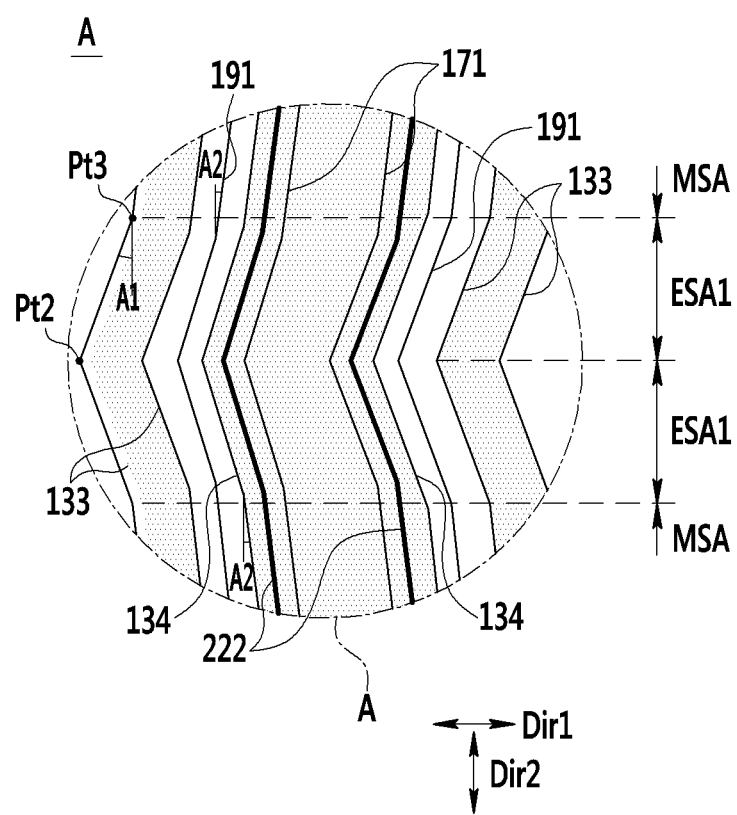
FIG. 4 is an enlarged view of a portion A of the liquid crystal display shown in FIG. 1.
Figure 5:
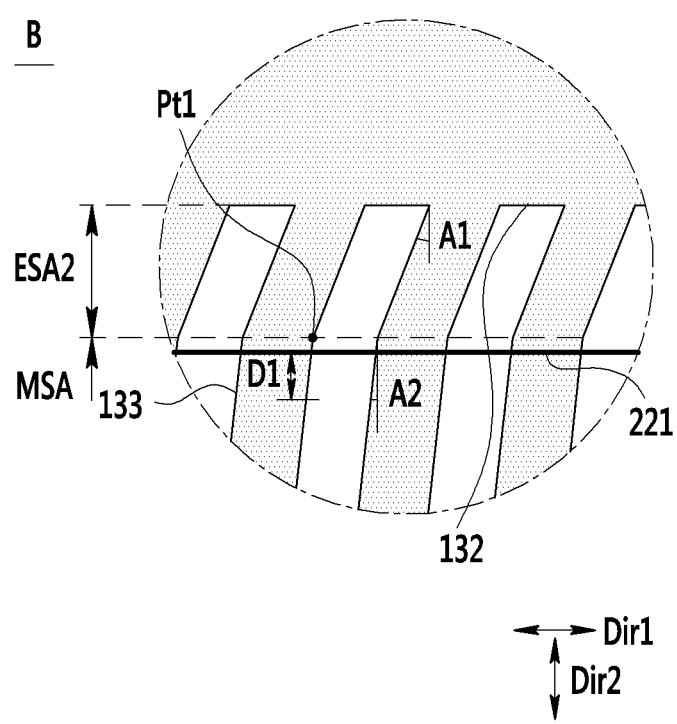
FIG. 5 is an enlarged view of a portion B of the liquid crystal display shown in FIG. 1.

FIG. 1 is a schematic layout view of two pixels of a liquid crystal display, according to an exemplary embodiment of the present invention, FIG. 2 is a top plan view of a field generating electrode of the liquid crystal display shown in FIG. 1, FIG. 3 is a cross-sectional view of the liquid crystal display shown in FIG. 1, taken along the line III-III'-III", FIG. 4 is an enlarged view of a portion A of the liquid crystal display shown in FIG. 1, and FIG. 5 is an enlarged view of a portion B of the liquid crystal display shown in FIG. 1.

Referring to FIGS. 1-5, the liquid crystal display includes a lower panel 100, an opposing upper panel 200, and a liquid crystal layer 3 interposed between the display panels 100 and 200. The upper panel 200 includes a light blocking member 220 and color filters 230, which are formed on an insulating substrate 210.

The light blocking member 220 includes a plurality of first light blocking portions 221 mainly extending in a first direction Dir1, and a plurality of second light blocking portions 222 mainly extending in a the second direction Dir2. The second light blocking portions 222 connect neighboring pairs of the first light blocking portions 221. The first light blocking portion 221 and the second light blocking portion 222 define an opening 225, through which light is transmitted. Each second light blocking portion 222 is bent at least once between a pair of neighboring first light blocking portions 221.

The color filers 230 are disposed substantially within the openings 225 of the light blocking member 220. The color filters 230 may be elongated throughout several pixel areas in the second direction Dir2. Each color filter 230 may display one primary color, such as red, green, or blue.

An overcoat 250 may be further formed on the light blocking member 220 and the color filter 230. According to some embodiments, at least one of the light blocking member 220 and the color filter 230 may be disposed on the lower panel 100.

The liquid crystal layer 3 includes liquid crystal molecules 31. When no electric field is applied to the liquid crystal molecules 31, the liquid crystal molecules 31 may be aligned so that the long axes thereof are parallel to the surfaces of the two panels 100 and 200.

Alignment layers 11 and 21 are coated on the inner surfaces of two display panels 100 and 200. The alignment layers 11 and 21 may be horizontal alignment layers. The alignment direction of the alignment layers 11 and 21 may be parallel to the second direction Dir2. Accordingly, the liquid crystal molecules 31 may be initially aligned parallel to the second direction Dir2.

The lower panel 100 includes a plurality of gate conductors formed on an insulating substrate 110. The gate conductors include a plurality of gate lines 121 and a plurality of common voltage lines 125.

The gate lines 121 transfer gate signals and extend substantially in the first direction Dir1. Each gate line 121 includes a plurality of gate electrodes 124 that protrude in the second direction Dir2.

The common voltage lines 125 transfer a predetermined voltage, such as a common voltage Vcom, extend substantially in the first direction Dir1, and may be substantially parallel to the gate lines 121. Each common voltage line 125 may include a plurality of expansions 126.

A gate insulating layer 140 is formed on the gate conductors 121 and 125. The gate insulating layer 140 may be made of an inorganic insulating material, such as silicon nitride ($SiN_x$) or silicon oxide ($SiO_x$).

Semiconductor stripes (not shown) are formed on the gate insulating layer 140. The semiconductor stripes extend substantially in the second direction Dir2. A plurality of semiconductor protrusions 154 extend toward the gate electrodes 124 from the semiconductor stripes.

A plurality of ohmic contact stripes (not shown) and a plurality of ohmic contact islands 165 are formed on the semiconductor stripes. The ohmic contact stripes have a plurality of protrusions 163 extending toward the gate electrode 124 and forming an inverted "C" shape. The protrusions and the island ohmic contacts 165 face each other in pairs with respect to the gate electrodes 124 and overlap the semiconductor protrusions 154. The ohmic contacts 163 and 165 may be made of a material such as n+ hydrogenated amorphous silicon doped with n-type impurities, such as phosphorus, at a high concentration, or may be formed of a silicide.

Data conductors including a plurality of data lines 171 and a plurality of drain electrodes 175 is formed on the ohmic contacts 163 and 165. The data lines 171 transfer data signals and extend substantially in the second direction Dir2, across the gate lines 121 and the common voltage lines 125. Each data line 171 includes a plurality of C-shaped source electrodes 173 extending toward the gate electrode 124. The second light blocking portion 222 extends along the data lines 171 and may cover the most of the data lines 171.

Each drain electrode 175 includes one bar-type end facing the source electrode 173 across the gate electrode 124. Each drain electrode 175 also includes another end having a wider area.

The gate electrode 124, the source electrode 173, and the drain electrode 175 form a thin film transistor (TFT) along with the semiconductor protrusion 154. The semiconductor stripes, except for the semiconductor protrusions 154, may have substantially the same shape as the data line 171, the drain electrode 175, and the underlying ohmic contacts 163 and 165. The data line 171 and the underlying ohmic contact stripe and semiconductor stripe are bent at least once between a pair of neighboring thin film transistors A pixel electrode 191 is formed on the data conductors 171 and 175 and the exposed semiconductor protrusion 154. A portion of the pixel electrode 191 directly contacts the wide end of the drain electrode 175, and the remaining portion contacts the gate insulating layer 140. The pixel electrode 191 receives a data voltage from the drain electrode 175. The pixel electrode 191 may be made of a transparent conductive material, such as ITO or IZO.

The pixel electrode 191 is planar and fills up most of the region (hereafter referred to as "a pixel area") enclosed by the gate line 121 and the data line 171. The pixel electrode 191 may have sides that are substantially parallel to the gate line 121 and the data line 171, and upper or lower corners, at which the thin film transistor or the expansion 126 is positioned, may be chamfered, but the shape thereof is not limited thereto.

A passivation layer 180 is formed on the pixel electrode 191, the data conductors 171 and 175, and the exposed semiconductor protrusion 154. The passivation layer 180 may be made of an inorganic insulator or an organic insulator. The passivation layer 180 and the gate insulating layer 140 have a plurality of contact holes 181 exposing the common voltage line 125, e.g., part of the expansion 126. Contact holes 181 may be positioned in at least every other pixel area.

Common electrodes 131, which may be made of a transparent conductive material such as ITO or IZO, are formed on the passivation layer 180. Referring to FIG. 1 and FIG. 2, one common electrode 131 is positioned in each pixel area, and the common electrodes 131 are connected to each other.

Each common electrode 131 includes a pair of transverse outer stems 132, a pair of longitudinal outer stems 134 connected to the transverse outer stems 132, and branch electrodes 133. The branch electrodes 133 are positioned between pairs of the longitudinal outer stems 134. The spaces between the branch electrodes 133 are may be referred to as slits. Common electrodes 131 adjacent in the second direction Dir2 share the transverse outer stem 132 that is positioned therebetween, so that the neighboring common electrodes 131 are connected with the boundary of the transverse outer stem 132. Common electrodes 131 adjacent in the first direction Dir1 share the longitudinal outer stem 134 that is positioned therebetween, so that the neighboring common electrodes 131 are connected with the boundary of the longitudinal outer stem 134.

The transverse outer stem 132 extends in the first direction Dir1 and is substantially parallel to the gate line 121. The transverse outer stem 132 includes expansions 137. The expansions 137 are positioned in at least every other pixel area and receive a predetermined voltage, such as a common voltage Vcom, from the common voltage line 125 and through the contact hole 181.

The longitudinal outer stem 134 and a plurality of branch electrodes 133 therebetween are connected to a pair of transverse outer stems 132 and are parallel to each other. The longitudinal outer stem 134 and the branch electrodes 133 are bent, such that central portions thereof protrude in the first direction Dir1. The common electrode 131 is divided into a first region Ra (first half) and a second region Rb (second half). In the present exemplary embodiment, the first region Ra is positioned above the second region Rb. A vertex Pt2 is formed in each of the branch electrodes 133, and the longitudinal outer stem 134 is positioned at the boundary of the pixel area.

In the present exemplary embodiment, the boundary between the first region Ra and the second region Rb may correspond to an imaginary transverse center line CT1 of the common electrode 131. In the first region Ra, the longitudinal outer stem 134 and the branch electrodes 133 extend in the right upper direction from the imaginary transverse center line CT1, while in the second region Rb, the longitudinal outer stem 134 and the branch electrodes 133 extend in the right lower direction from the imaginary transverse center line CT1.

The branch electrodes 133 are bent at least once in the first region Ra and the second region Rb. In each of the first region Ra and the second region Rb, the branch electrodes 133 may respectively include a pair of edge portions ESA1 and ESA2 and a central portion MSA positioned therebetween.

The edge portions ESA1 are directly adjacent to the imaginary transverse center line CT1. Referring to FIG. 4, vertexes Pt3 of the branch electrodes 133 and the longitudinal outer stem 134 are positioned at the boundary between the edge portions ESA1 and the central portions MSA. The edge portions ESA2 refer to portions of the branch electrodes 133 positioned near the transverse outer stem 132. Referring to FIG. 5, the vertexes PO of the branch electrodes 133 and the longitudinal outer stems 134 are positioned at a boundary between the edge portions ESA2 and the central portions MSA. The length of the edge portions ESA1 and ESA2 is shorter than the length of the central portions MSA (lengths extending in the second direction Dir2).

Referring to FIG. 1, FIG. 4, and FIG. 5, in edge portions ESA1 and ESA2, the angles A1 may be substantially the same. Hereafter, when an angle is designated, an acute angle will be designated rather than an obtuse angle.

In the edge portions ESA1 and ESA2, the angle A1 is larger than an angle A2 of the branch electrodes 133 in the central portion MSA. For example, in the edge portions ESA1 and ESA2, the angle A1 may range from 15 degrees to 30 degrees. Also, the angle A2 may range from 0 degrees to 15 degrees. Accordingly, referring to FIG. 4 and FIG. 5, the branch electrodes 133 and the longitudinal outer stem 134 are bent at the boundary between the edge portions ESA1 and ESA2 and the central portion MSA. Particularly, the longitudinal outer stem 134 and the branch electrodes 133 each have a vertex Pt3 at the boundary between the edge portion ESA1 and the central portion MSA. The longitudinal outer stem 134 and the branch electrodes 133 each have a vertex Pt1 at the boundary between the edge portion ESA2 and the central portion MSA.

The width of the branch electrodes 133 may be substantially uniform in the central portion MSA or in most of the edge portions ESA1 and ESA2. In particular, the edges of the branch electrodes 133 may be substantially parallel to (consistently spaced from) each other in the central portion MSA or in most of the edge portions ESA1 and ESA2.

Referring to FIG. 1 and FIG. 5, the edge portions ESA2 overlap the light blocking member 220. For example, the edge portions ESA2 overlap the first light blocking portions 221 of the light blocking member 220. In particular, the vertexes PO of the branch electrodes 133 are positioned outside of the opening 225 of the light blocking member 220. However, according to some embodiments, the vertexes Pt1 may be disposed inside of the opening 225, but within a distance D1 of a corresponding edge of the opening 225. The distance D1 may be from 0 to 3 μm. As described above, the edge portions ESA2 of the branch electrodes 133 are completely or partially overlapped with the light blocking member 220, such that a decrease of the transmittance may be minimized in the edge portion ESA2.

The width W1 of the branch electrodes 133 may be in a range from about 2.5 μm to about 3.5 μm, and the width W2 of the interval (slit) between the branch electrodes 133 may be in a range from about 4.5 μm to about 5.5 μm. That is, the pitch of the branch electrodes 133 may be in a range from about 7 μm to about 9 μm, about 7.5 μm to about 8.5 μm, or may be about 8 μm, for example.

The width of the longitudinal outer stem 134 may be larger than the width of the branch electrodes 133. The longitudinal outer stem 134 may cover most of the data line 171.

In the present exemplary embodiment, the common electrode 131 is substantially inversely symmetrical in shape, with respect to the transverse center line CT1. However, the present invention is not limited thereto. In the first region Ra and the second region Rb, the angles A1 and A2 may be different from each other.

Referring to FIG. 1, FIG. 2, FIG. 4, and FIG. 5, at least one of the data line 171 and the second light blocking portion 222 extends parallel to the branch electrodes 133 and/or the longitudinal outer stem 134. The branch electrodes 133 and/or the longitudinal outer stem 134 are generally bent with the same angles in corresponding portions thereof. Likewise, the right and left edges of the pixel electrode 191 or the edge of the color filter 230 (not shown, however it is generally parallel to the right and left edges of the pixel electrode 191) may extend parallel to the branch electrodes 133 and/or the longitudinal outer stem 134, and may be bent with the same angles as the branch electrodes 133 and/or the longitudinal outer stem 134. As described above, at least two of the data line 171, the second light blocking portion 222, the outer edge of the pixel electrode 191, or the outer edge of the color filter 230, and preferably all, are formed parallel to the branch electrodes 133 and/or the longitudinal outer stem 134, such that the aperture ratio of the liquid crystal display is maximized, thereby improving the transmittance.

The pixel electrode 191 receives the data voltage through the thin film transistor, and the common electrode 131 receives the common voltage Vcom, to generate an electric field in the liquid crystal layer 3. As such, the orientations of the liquid crystal molecules 31 of the liquid crystal layer 3 are controlled to display an image.

As described in the exemplary embodiment of the present invention, by forming a plurality of regions having different angles at which the branch electrodes 133 are inclined, it is possible to increase the reference viewing angle of the liquid crystal display and to maximize the response speed of the liquid crystal molecules 31, by varying the inclination direction of the liquid crystal molecules 31 of the liquid crystal layer 3. In the exemplary embodiment shown in FIG. 1 to FIG. 5, the common electrode 131 is divided into the first region Ra and the second region Rb, such that the liquid crystal molecules 31 are inclined in two corresponding directions.

Also, without the boundary regions ESA1 and ESA2, the liquid crystal molecules 31 in an outer boundary area of the common electrode 131, or at the boundary between the first region Ra and the second region Rb, may be apt align away from the alignment direction of the liquid crystal molecules in the central portion MSA. Accordingly, such an alignment may affect the liquid crystal molecules in the central portion MSA and textures may be generated. However, since edge portion ESA1 and ESA2 are bent, the orientations of the liquid crystal molecules 31 disposed adjacent thereto may be controlled, such that neighboring liquid crystal molecules 31 are not counter twisted and/or colliding with each other. Also, the arrangement direction of the liquid crystal molecules 31 reduces bruising that occurs when the display panels 100 and 200 are pressed inwards. The vertexes PO are overlapped with the light blocking member 220, manufacturing process margins are increased and the transmittance decrease is minimized in the edge portions ESA2.

Figure 6:
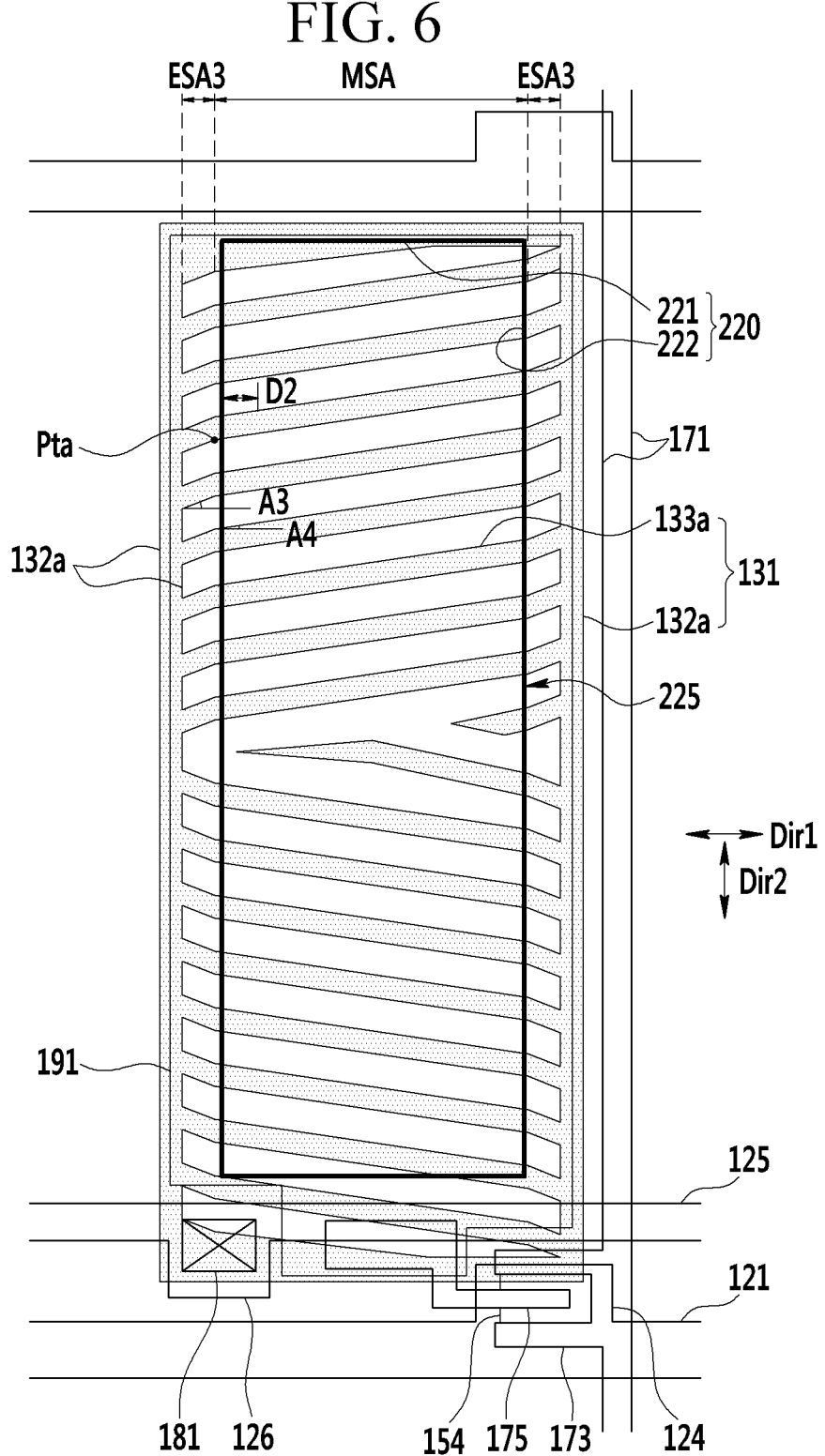
FIG. 6 is a layout view of one pixel of a liquid crystal display, according to an exemplary embodiment of the present invention.

FIG. 6 is a layout view of one pixel of a liquid crystal display, according to an exemplary embodiment of the present invention. The liquid crystal display is similar to the exemplary embodiment of FIG. 1 to FIG. 5, so only differences therebetween will be described in detail.

Referring to FIG. 6, the light blocking member 220 and the color filter 230 are formed on the insulation substrate 210. The light blocking member 220 includes the first light blocking portion 221 and the second light blocking portion 222, which define the opening 225.

Gate lines 121 and common voltage lines 125 are formed on the insulation substrate 110, and a gate insulating layer 140, semiconductors, including protrusions 154, ohmic contacts, and data lines 171, and drain electrodes 175 are sequentially formed thereon. The pixel electrode 191 having a planar shape and contacting the drain electrode 175 is formed thereon. The pixel electrode 191 may be rectangular and may have sides that are substantially parallel to the gate line 121 and the data line 171. The sides may be chamfered, but the shape thereof is not limited thereto. A passivation layer 180 and common electrodes 131 are sequentially formed on the pixel electrode 191.

Each common electrode 131 includes a pair of outer stems 132a and branch electrodes 133a extending therebetween. The outer stems 132a mainly extend in the second direction Dir2 and are parallel to the data line 171. The branch electrodes 133a connect the outer stems 132a and form an oblique angle with respect to the first direction Dir1.

The branch electrodes 133 are each divided into a pair of edge portions ESA3 positioned near the outer stems 132a and a central portion MSA disposed therebetween. The width of the edge portions ESA3 is less than that of the central portion MSA (widths taken in the first direction Dir1). Also, the angle A3 formed between the edge portion ESA3 and the first direction Dir1 in is larger than the angle A4 formed between the central portion MSA the first direction Dir1. In particular, the angle A3 may be between 15 degrees and 30 degrees, and the angle A4 may be between 0 degrees and 15 degrees. The angle A3 of each of the edge portions ESA3 may be the same or may be different.

In the present exemplary embodiment, the boundaries between the edge portions ESA3 and the central portion MSA, that is, the vertexes Pta of the branch electrodes 133a, are positioned outside of the opening 225, so at to be overlapped with the light blocking layer 220. In the alternative, the vertexes Pta may be disposed in the opening 225, but within a second distance D2 from the corresponding edge of the opening 225. The second distance D2 may be about 31 μm or less.

The common electrode 131 is shown to be positioned on the pixel electrode 191, on the basis of the substrate 110. However, the orientations of the pixel electrode 191 and the common electrode 131 may be reversed. In this case, the features of the common electrode 131 described above may be applied to the pixel electrode 191, with the common electrode 131 receiving the common voltage and the pixel electrode 191 receiving the data voltage to form an electric field in the liquid crystal layer 3.

Figure 7:
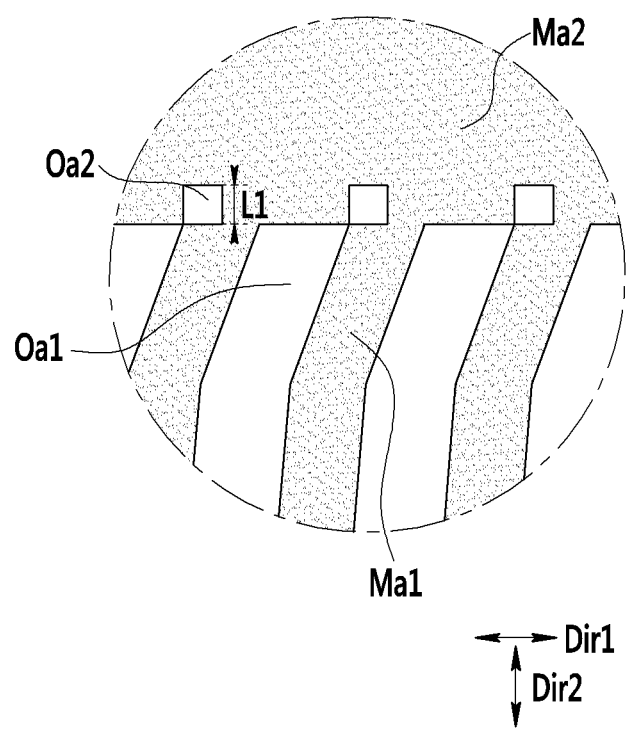
FIG. 7 is a view of a portion of an exposure mask used to form a field generating electrode of a liquid crystal display, according to an exemplary embodiment of the present invention.

FIG. 7 shows an exposure mask used to form a field generating electrode of a liquid crystal display, according to an exemplary embodiment of the present invention, and particularly, a portion of the exposure mask corresponding to the portion A of the liquid crystal display shown in FIG. 1 and FIG. 4. Referring to FIGS. 1, 4, and 7, a transparent conductive material, such as ITO or IZO, is deposited on a passivation layer 180, and a photosensitive film is coated thereon. Next, the photosensitive film is exposed through the exposure mask, to form a photosensitive film pattern. When the photoresist film has positive photosensitivity, in which a part to which light is radiated is removed, the portions of the exposure mask corresponding to the common electrode 131 may be opaque, and the remaining portions may be transparent.

Referring to FIG. 7, the exposure mask includes a first opaque portion Ma1 and a second opaque portion Ma2. The first opaque portion Ma1 corresponds to the branch electrodes 133, and the second opaque portion Ma2 corresponds to the transverse outer stem 132.

The exposure mask includes first transparent portions Oa1 and second transparent portions Oa2. The first transparent portions Oa1 corresponds to the spaces (slits) between neighboring branch electrodes 133. The second transparent portions Oa2 are generally rectangular, and have corners that are connected to corners of the first transparent portions Oa1. The ends of the first transparent portions Oa1 are bent, so as to correspond to the ends of the branch electrodes 133. Each second transparent portion Oa2 has four edges that are substantially perpendicular, and the length L1 of one edge is at least about 2 μm, which is less than the resolution (e.g., 4 μm) of an exposure apparatus. The exposed transparent conductive material layer is etched, to form a plurality of common electrodes 131.

Since the second transparent portions Oa2 are formed adjacent to acute corners of the first transparent portions Qa1 and are smaller than the resolution of the exposure device, the corresponding corners of the common electrode may be more sharply formed. In other words, the second transparent portions Qa2 compensate for the acute corners being smaller than the resolution limit of the exposure device. Accordingly, the liquid crystal molecules can be more effectively controlled in the vicinity of the acute corners of the common electrode 131 and textures can be reduced, thereby improving the display quality of the liquid crystal display.

Figure 8:
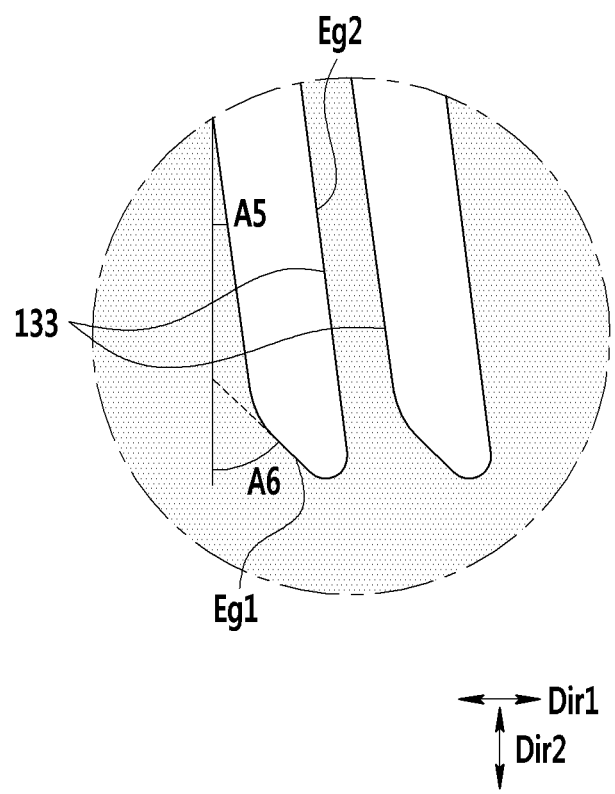
FIG. 8 is a view of a portion of a field generating electrode of a liquid crystal display, according to an exemplary embodiment of the present invention.

FIG. 8 is a view showing a portion of a common electrode of a liquid crystal display, according to an exemplary embodiment of the present invention. Referring to FIG. 8, most of the liquid crystal display according to an exemplary embodiment of the present invention is the same as the liquid crystal display shown in FIG. 1 to FIG. 5, however, the shape of the end of the slit between the branch electrodes 133 of the common electrode 131 is different.

In the present exemplary embodiment, opposing both edges Eg2 of the common electrode 131 are parallel to each other, and an edge Eg1 at the end of the slit is obliquely inclined in the first direction Dir1. The angle A5 between edges Eg2 and the second direction Dir2 may be between about 0 degrees and about 15 degrees. Angle A6 between the edge Eg1 and the second direction Dir2 may be between about 30 degrees and about 75 degrees, while the angle formed between the edges Eg2 and Eg3 may be in a range from about 30 degrees to about 60 degrees.

Accordingly, display deterioration, such as the formation of textures and the stains, may be reduced in the edge portion of the common electrode 131. Also, in the liquid crystal display according to the present exemplary embodiment, the branch electrodes 133 may include the edge portion ESA1 near the imaginary transverse center line CT1, like the liquid crystal display shown in FIG. 1 to FIG. 5, or not. Several characteristics and effects of the exemplary embodiment of FIG. 1 to FIG. 5 may also be applied to the present exemplary embodiment of FIG. 8.

Figure 9:
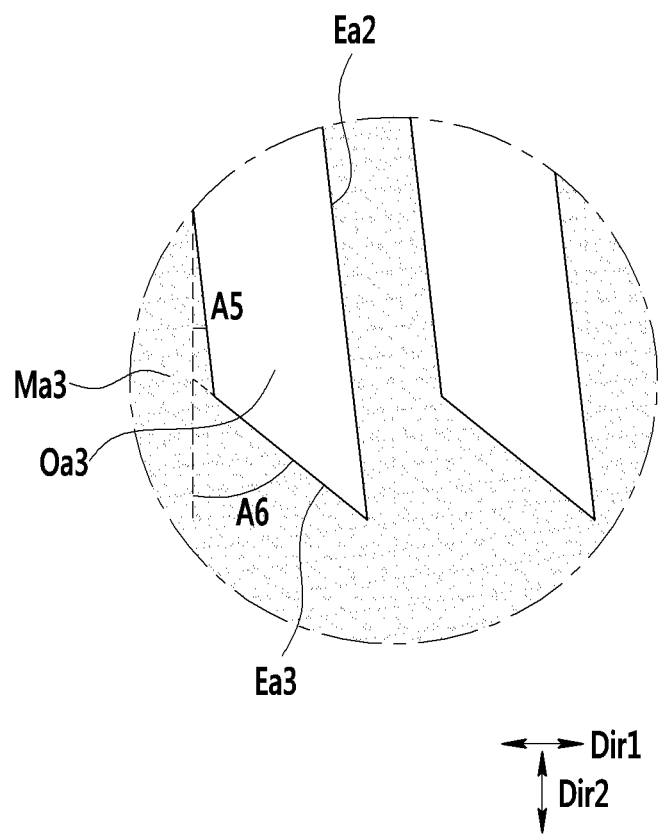
FIG. 9, FIG. 10, FIG. 11, and FIG. 12 are views of a portion of an exposure mask used to form a field generating electrode of a liquid crystal display, according to an exemplary embodiment of the present invention.

FIG. 9, FIG. 10, FIG. 11, and FIG. 12 are views of portions of exposure masks used to form field generating electrodes of a liquid crystal display, according to exemplary embodiments of the present invention. Referring to FIG. 9, an exposure mask according to the present exemplary embodiment includes an opaque portion Ma3 corresponding to the branch electrodes 133 of FIG. 8 and a transparent portion Oa3 corresponding to the slit.

The exposure mask shown in FIG. 9 is similar to the mask shown in FIG. 8. That is, an edge Ea3 at the end of the transparent portion Oa3 is obliquely inclined with respect to the first direction Dir1, and the angle formed by the edge Ea3 with the edge Ea2 is an acute angle. The edge Ea2 may form the angle A5 with respect to the second direction Dir2. The angle A5 may be greater than about 0 degrees and less than 15 degrees. An angle A6 formed by the edge Ea3 with the second direction Dir2 may be in a range from about 30 degrees to about 60 degrees. As shown in FIG. 9, if the common electrode 131 is formed by using the exposure mask, the branch electrodes 133 shown in FIG. 8 may be obtained.

Figure 10:
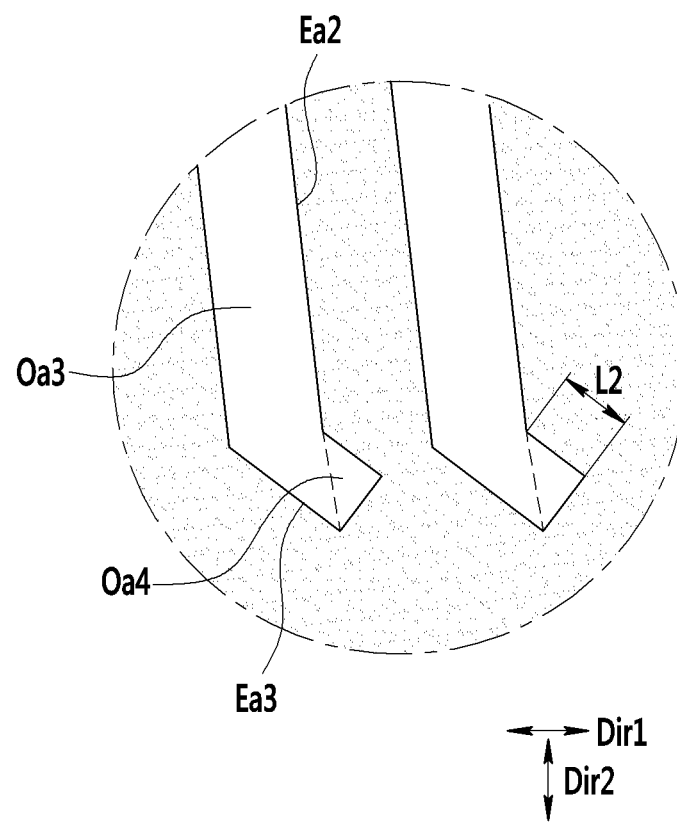

Referring to FIG. 10, an exposure mask according to the present exemplary embodiment is similar to the exposure mask shown in FIG. 9. However a transparent portion Oa4 is additionally connected to the transparent portion Oa3. The transparent portion Oa4 is generally triangular, and in particular, may be in the form of a right isosceles triangle. The length L2 of the two legs of the transparent portion Oa4 may be between about 2 μm and the resolution of the light exposure device (e.g., 4 μm). For example, the length L2 may be about 3 μm.

Figure 11:
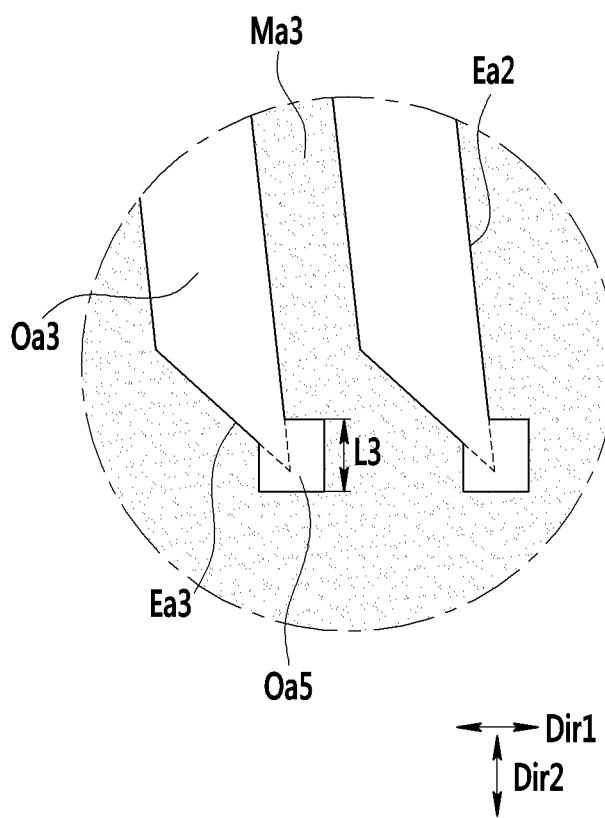

Referring to FIG. 11, an exposure mask according to an exemplary embodiment is similar to the exposure mask shown in FIG. 9. However, an additional transparent portion Oa5 is connected to the transparent portion Oa3. The transparent portion Oa5 may be generally rectangular or square. The length L3 of edges of the transparent portion Oa5 may between 2 μm and the resolution (e.g., 4 μm) of the light exposure device. The length of edges connected to the transparent portion Oa3 may be less than the length L3 and more than 1.5 μm.

Figure 12:
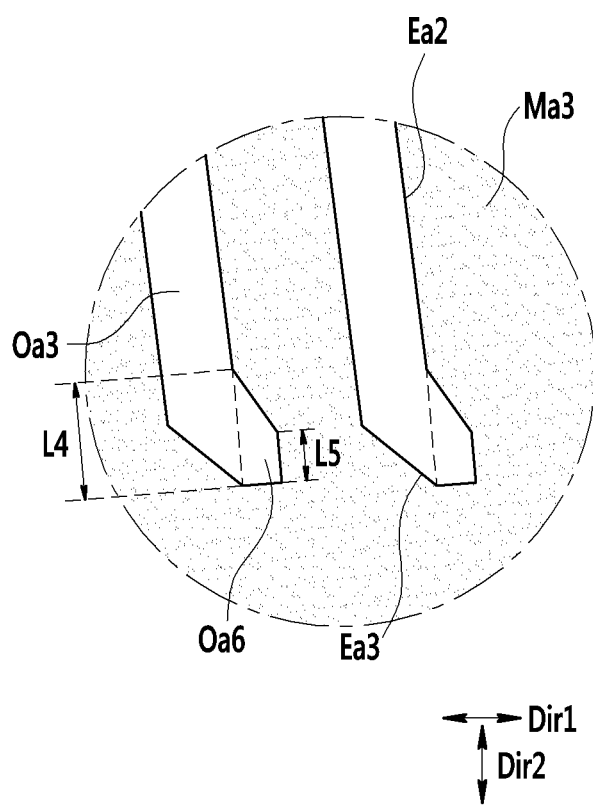

Referring to FIG. 12, an exposure mask according to an exemplary embodiment is similar to the exposure mask shown in FIG. 9. However, an additional transparent portion Oa6 is connected to the transparent portion Oa3. The transparent portion Oa6 is generally trapezoidal. The length L5 of one of the two parallel edges of transparent portion Oa6 may be more than 2 μm and less than the resolution of the light exposure apparatus (e.g., 4 μm), and the length L4 of the parallel edge may be longer than the length L5 and shorter than 9 μm.

As described above, if additional transparent portions Oa4, Oa5, and Oa6 having various shapes like FIG. 10, FIG. 11, and FIG. 12 are added to the transparent portion Oa3, the acute angle between the edge Eg1 and the edge Eg2 may be sharp, such that the liquid crystal molecules may be effectively controlled near the edge of the branch electrodes 133 and texture may be further reduced.

The above exposure masks shown in FIG. 7, FIG. 9, FIG. 10, FIG. 11, and FIG. 12 are described for exposing the photosensitive film having a positive photosensitivity, however in a case of a photosensitive film having negative photosensitivity, the transparency of the exposure mask shown in FIG. 7, FIG. 9, FIG. 10, FIG. 11, and FIG. 12 may be reversed.

Also, the disclosed exposure masks may be used to form the common electrode 131 including the branch electrodes 133. However, the present disclosure is not limited thereto. That is, the exposure masks may be used to form a pixel electrode It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display comprising:
a first substrate and an opposing second substrate;
a liquid crystal layer interposed between the first substrate and the second substrate;
a first field generating electrode disposed on the first substrate;
a second field generating electrode overlapping the first field generating electrode and comprising branch electrodes; and
a light blocking member disposed on the first substrate or the second substrate;
a gate line disposed on the first substrate and extending in a first direction,
wherein,
a slit between adjacent branch electrodes comprises a first edge, an opposing second edge, and a third edge extending between the first edge and the second edge, and
the third edge overlaps the light blocking member.

2. The liquid crystal display of claim 1, wherein the third edge is inclined with respect to the first direction.

3. The liquid crystal display of claim 2, wherein an angle between the third edge and the second edge is an acute angle.

4. The liquid crystal display of claim 3, wherein an angle formed between the third edge and a second direction that is perpendicular to the first direction ranges from about 30 degrees to about 75 degrees.

5. The liquid crystal display of claim 4, wherein an angle formed between the third edge and the second edge ranges from about 30 degrees to about 60 degrees.

6. The liquid crystal display of claim 5, wherein an angle formed between the first edge or the second edge and the second direction is greater than 0 degrees and less than 15 degrees.

7. The liquid crystal display of claim 6, further comprising a data line disposed on the first substrate and crossing the gate line, wherein:
the light blocking member comprises a first light blocking portion covering the data line;
a branch electrode of the branch electrodes comprises a central portion and an edge portion disposed at an end of the central portion;
the edge portion extends lengthwise at a first angle with respect to the second direction;
the central portion extends lengthwise at a second angle with respect to the second direction;
the first angle is greater than a second angle; and
the first light blocking portion and the data line are parallel to the branch electrodes.

8. The liquid crystal display of claim 7, wherein opposing sides of the central portion are substantially parallel.

9. The liquid crystal display of claim 4, wherein an angle formed between the first edge or the second edge and the second direction is greater than 0 degrees and less than 15 degrees.

10. The liquid crystal display of claim 4, further comprising a data line disposed on the first substrate and crossing the gate line, wherein,
the light blocking member comprises a first light blocking portion covering the data line;
a branch electrode of the branch electrodes comprises a central portion and an edge portion disposed at an end of the central portion;
the edge portion extends lengthwise at a first angle with respect to the second direction,
the central portion extends lengthwise at a second angle with respect to the second direction,
the second angle is smaller than the first angle, and
the first light blocking portion and the data line are parallel to the branch electrodes.

11. The liquid crystal display of claim 10, wherein opposing sides of the central portion are substantially parallel.

* * * * *